June 17, 1930.   L. A. COLELLA   1,764,199
TOY VEHICLE
Filed March 14, 1929
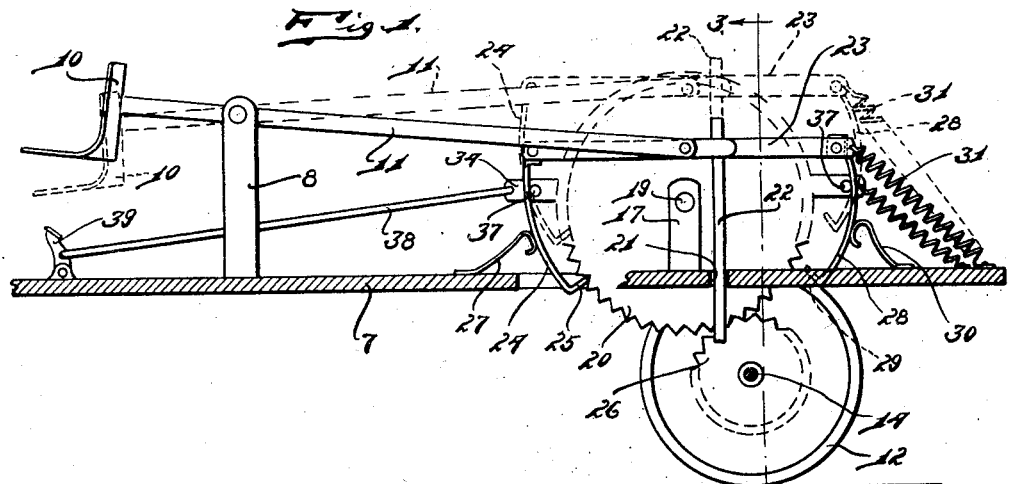
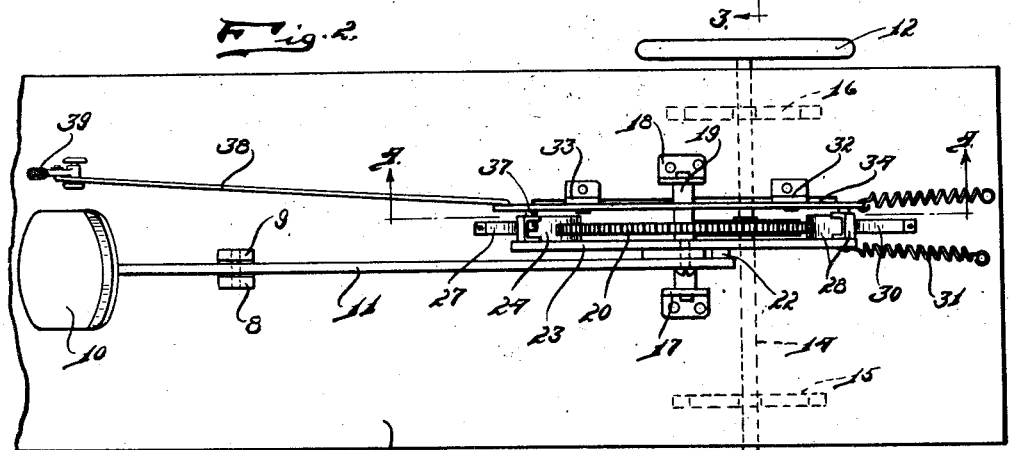
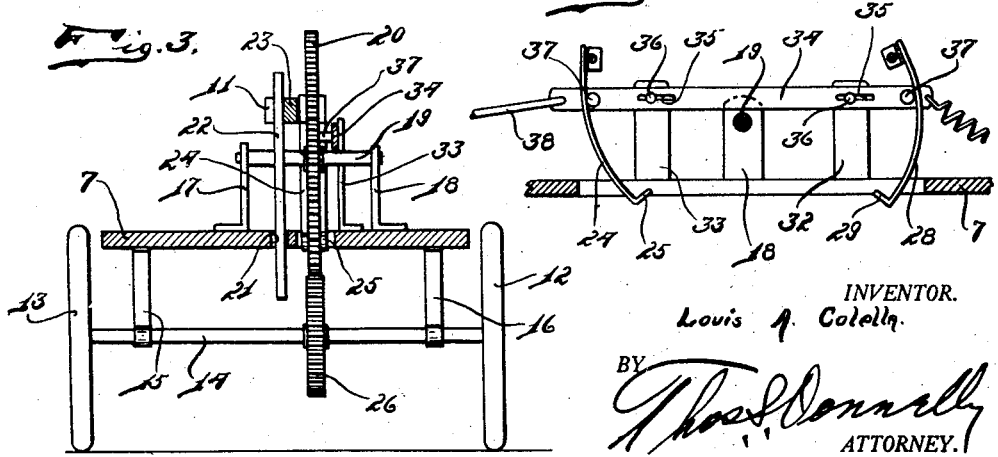
INVENTOR.
Louis A. Colella.
BY
Thos. F. Donnelly
ATTORNEY.

Patented June 17, 1930

1,764,199

UNITED STATES PATENT OFFICE

LOUIS A. COLELLA, OF DETROIT, MICHIGAN

TOY VEHICLE

Application filed March 14, 1929. Serial No. 346,822.

My invention relates to a new and useful improvement in a toy vehicle adapted for use particularly by children as a means of propelling themselves.

It is an object of the present invention to provide a vehicle of this class whereby the user may, through a bouncing of the seat or a teetering thereof, effect either a forward or a rearward movement of the vehicle.

Another object of the invention is the provision of means for determining the direction of movement of the vehicle.

Another object of the invention is the provision of a device of this class which will be simple of structure, economical of manufacture and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a central longitudinal vertical sectional view of the invention.

Fig. 2 is a top plan view of the invention.

Fig. 3 is a sectional view taken on line 3—3 of Fig. 1.

Fig. 4 is a view taken on line 4—4 of Fig. 2.

In the drawings I have illustrated the invention used with a body having a base 7 projecting upwardly from which are spaced supports 8 and 9 and pivoted between which is a bar 11 on which is mounted a seat 10. Traction wheels 12 and 13 are fixedly mounted on an axle 14 which projects through suitable bolsters 15 and 16. In the drawings but one side of the vehicle is shown as the opposite side is supported on wheels in a well known manner. Journaled in supports 17 and 18 which project upwardly from the base is a shaft 19 on which is mounted a gear 20. Extending through the opening 21 in the base is a rod 22 on which is mounted a bar 23 to which one end of the bar 11 is pivoted. An actuating spring arm 24 is mounted on one end of the bar 23 and has its end 25 turned inwardly to engage the teeth of the gear 20, this gear 20 meshing with a gear 26 fixedly mounted on the axle 14. A spring 27 serves to move the detent or inturned end 25 of the spring arm 24 into position for engaging the teeth of the gear 20. A similar spring arm 28 is mounted on the opposite end of the bar 23 and provided with the inturned end 29. A spring 30 serves to press the spring arm 28 into position for engaging the teeth of the gear 20. A coil spring 31 is attached to one end of the bar 23 and serves normally to move it forwardly into the position shown in Fig. 1. Mounted on brackets 32 and 33 which project upwardly from the base, is a bar 34 having slots 35 through which the pins 36 project. Pins 37 are mounted in the bar 34 and serve to engage the spring arms 28 and 24. A rod 38 connects to the bar 34 and to an operating pedal 39 which is rockably mounted on the base 7.

In operation, when the user is sitting on the seat 10 and teeters the bar 11, the bar 23 will be moved upwardly and downwardly. By adjusting the pedal 39 to the desired position, the bar 34 will be moved so that either the spring arm 28 will engage the teeth of the gear 20 or the spring arm 24 will engage these teeth. The direction of travel of the vehicle will depend upon which arm engages the teeth. As the bar 23 moves upwardly, the inturned ends 25 or 29 of the spring arms, will engage the teeth and effect a rotation of the gear 30 and thus propel the vehicle.

While I have illustrated and described the preferred form of my invention, I do not wish to limit myself to the precise detail of structure shown but desire to avail myself of such variations and modifications as come within the scope of the appended claims.

Having thus described my invention, what I claim as new and desire to secure by Letters Patent is:

1. A device of the class described comprising: a base; a rockable arm; a gear rotatably mounted on said base; an arm pivotally connected to one end of said rockable arm and extending diametrically of said gear; a resilient arm on each end of said bar engaging the teeth of said gear and adapted for effecting rotation of said gear upon rocking of said rockable bar.

2. A device of the class described adapted for use with a vehicle having traction wheels comprising: a gear adapted upon rotation for effecting a rotation of said traction wheels; a rockable arm; a bar extending diametrically of said gear; teeth engaging arms on said bar at opposite ends thereof for engaging the teeth of said gear and for rotating said bar upon rockable movement of said rockable arm; and means for adjusting said teeth engaging arms to determine direction of rotation of said gear.

In testimony whereof I have signed the foregoing specification.

LOUIS A. COLELLA.